US010102596B2

(12) United States Patent
Garrett et al.

(10) Patent No.: US 10,102,596 B2
(45) Date of Patent: Oct. 16, 2018

(54) CUSTOMER INTERFACE RESTAURANT SYSTEM

(71) Applicant: Tillster, Inc., San Diego, CA (US)

(72) Inventors: James M. Garrett, Suwanee, GA (US); Ryan Connelly, Atlanta, GA (US)

(73) Assignee: Tillster, Inc., Los Angeles, CA (US)

( * ) Notice: Subject to any disclaimer, the term of this patent is extended or adjusted under 35 U.S.C. 154(b) by 195 days.

(21) Appl. No.: 14/274,416

(22) Filed: May 9, 2014

(65) Prior Publication Data

US 2014/0249938 A1   Sep. 4, 2014

Related U.S. Application Data

(63) Continuation-in-part of application No. 13/212,905, filed on Aug. 18, 2011.

(60) Provisional application No. 61/390,607, filed on Oct. 6, 2010.

(51) Int. Cl.
  G06F 15/16    (2006.01)
  G06Q 50/12    (2012.01)
  G06Q 30/06    (2012.01)

(52) U.S. Cl.
  CPC .............. *G06Q 50/12* (2013.01); *G06Q 30/06* (2013.01); *G06Q 30/0623* (2013.01)

(58) Field of Classification Search
  CPC .............................. H04W 4/021; H04W 92/08
  See application file for complete search history.

(56) References Cited

U.S. PATENT DOCUMENTS

| | | | | |
|---|---|---|---|---|
| 4,114,601 A | * | 9/1978 | Abels ...................... | A61B 5/06 128/899 |
| 5,190,059 A | * | 3/1993 | Fabian ..................... | A61B 5/06 128/899 |
| 5,931,824 A | * | 8/1999 | Stewart ................... | A61F 13/44 604/358 |
| 6,026,375 A | * | 2/2000 | Hall ........................ | G06Q 10/08 701/533 |
| 6,076,007 A | * | 6/2000 | England ................. | G01V 15/00 128/899 |
| 6,366,206 B1 | * | 4/2002 | Ishikawa ............... | G06K 19/077 340/572.1 |

(Continued)

OTHER PUBLICATIONS

Garrett, James M.; Final Office Action for U.S. Appl. No. 13/212,905, filed Aug. 18, 2011, dated Mar. 29, 2013; 13 pgs.

(Continued)

*Primary Examiner* — Talia F Crawley
(74) *Attorney, Agent, or Firm* — Taylor English Duma LLP

(57) ABSTRACT

Systems and methods for ordering systems and, more specifically, to a proximity based ordering system are disclosed herein. A computer-implemented method, according to some implementations of the present disclosure, includes receiving, in a computer system, a selection of an order by a user of a user device, the order including a selection of a restaurant and at least one item to purchase from the restaurant, determining, by the computer system, if the user is within a geofence defined in regard to the restaurant, upon determining that the user is not within the geofence, holding, by the computer system, the order from being prepared at the restaurant, and upon determining that the user is within the geofence, releasing, by the computer system, the order to be prepared at the restaurant.

19 Claims, 3 Drawing Sheets

(56) References Cited

U.S. PATENT DOCUMENTS

| | | | | |
|---|---|---|---|---|
| 6,400,272 | B1* | 6/2002 | Holtzman | G06K 7/0008 340/572.1 |
| 6,424,262 | B2* | 7/2002 | Garber | G06K 7/10079 335/284 |
| 6,473,739 | B1* | 10/2002 | Showghi | G06Q 10/02 358/442 |
| 6,574,603 | B1 | 6/2003 | Dickson et al. | |
| 6,600,418 | B2* | 7/2003 | Francis | G06K 17/00 340/10.1 |
| 6,640,214 | B1* | 10/2003 | Nambudiri | G06Q 10/087 705/21 |
| 6,669,089 | B2* | 12/2003 | Cybulski | B65D 19/00 235/383 |
| 6,768,419 | B2* | 7/2004 | Garber | G06K 7/0008 235/385 |
| 6,809,645 | B1* | 10/2004 | Mason | G08B 13/246 235/385 |
| 6,861,954 | B2* | 3/2005 | Levin | A61B 19/44 340/539.12 |
| 6,865,261 | B1 | 3/2005 | Rao et al. | |
| 6,900,731 | B2* | 5/2005 | Kreiner | G06Q 10/087 235/385 |
| 7,019,650 | B2* | 3/2006 | Volpi | G06K 7/0008 340/520 |
| 7,110,964 | B2* | 9/2006 | Tengler | G06Q 10/087 705/15 |
| 7,142,118 | B2* | 11/2006 | Hamilton | G06Q 50/22 209/3.3 |
| 7,287,002 | B1* | 10/2007 | Asher | G06Q 10/08 705/26.8 |
| 7,307,530 | B2* | 12/2007 | Fabian | A61B 5/06 340/571 |
| 7,557,710 | B2* | 7/2009 | Sanchez | A61B 19/0248 235/385 |
| 7,848,765 | B2* | 12/2010 | Phillips | G08B 21/0236 455/404.2 |
| 7,953,873 | B1 | 5/2011 | Madurzak | |
| 8,204,757 | B2* | 6/2012 | Carlson | G06Q 10/02 705/1.1 |
| 8,498,900 | B1 | 7/2013 | Spirin et al. | |
| 8,624,727 | B2 | 1/2014 | Saigh | |
| 8,706,542 | B2* | 4/2014 | O'Meara | G06Q 10/06 705/7.16 |
| 8,762,208 | B2 | 6/2014 | Hutcherson | |
| 9,129,289 | B2* | 9/2015 | Vaughn | G06Q 30/02 |
| 2002/0026364 | A1 | 2/2002 | Mayer et al. | |
| 2002/0067263 | A1* | 6/2002 | Tafoya | G06K 17/00 340/572.1 |
| 2002/0138350 | A1 | 9/2002 | Cogen | |
| 2002/0143320 | A1* | 10/2002 | Levin | A61B 19/44 606/1 |
| 2002/0143655 | A1* | 10/2002 | Elston | G06Q 20/02 705/26.81 |
| 2003/0001776 | A1* | 1/2003 | Hannah | G01S 1/24 342/387 |
| 2003/0066537 | A1* | 4/2003 | Fabian | A61B 5/06 128/899 |
| 2003/0105394 | A1* | 6/2003 | Fabian | A61B 19/44 600/407 |
| 2003/0208409 | A1* | 11/2003 | Mault | G06F 19/3475 705/15 |
| 2004/0054592 | A1* | 3/2004 | Hernblad | G06Q 20/32 705/15 |
| 2004/0084525 | A1* | 5/2004 | Kreiner | G07C 9/00111 235/384 |
| 2004/0129279 | A1* | 7/2004 | Fabian | A61B 19/44 128/899 |
| 2004/0201479 | A1* | 10/2004 | Garber | G06K 7/0008 340/572.1 |
| 2004/0210621 | A1* | 10/2004 | Antonellis | G06Q 10/087 709/200 |
| 2004/0250819 | A1* | 12/2004 | Blair | A61B 5/07 128/899 |
| 2005/0004843 | A1 | 1/2005 | Heflin | |
| 2005/0049922 | A1 | 3/2005 | Kargman | |
| 2006/0047835 | A1 | 3/2006 | Greaux | |
| 2006/0085265 | A1 | 4/2006 | Dietz et al. | |
| 2006/0218040 | A1 | 9/2006 | Sabapathypillai | |
| 2007/0053306 | A1* | 3/2007 | Stevens | G06F 21/43 370/252 |
| 2007/0055785 | A1* | 3/2007 | Stevens | G06Q 20/32 709/229 |
| 2007/0088624 | A1 | 4/2007 | Vaughn et al. | |
| 2007/0093709 | A1* | 4/2007 | Abernathie | A61B 19/54 600/407 |
| 2007/0290030 | A1* | 12/2007 | Fox | G06F 19/327 235/375 |
| 2008/0222004 | A1 | 9/2008 | Pollock | |
| 2008/0249898 | A1* | 10/2008 | Ratnakar | G01S 5/0018 705/27.1 |
| 2009/0099972 | A1 | 4/2009 | Angert et al. | |
| 2009/0106124 | A1 | 4/2009 | Yang | |
| 2009/0182630 | A1 | 7/2009 | Otto et al. | |
| 2009/0187488 | A1* | 7/2009 | Shamilian | G06Q 10/02 705/16 |
| 2009/0228325 | A1* | 9/2009 | Simmons | G06Q 10/06313 705/7.23 |
| 2009/0229325 | A1 | 9/2009 | Cymbal | |
| 2009/0281903 | A1 | 11/2009 | Blatstein | |
| 2009/0313138 | A1* | 12/2009 | Ratnakar | G01S 5/0018 705/26.1 |
| 2010/0076853 | A1 | 3/2010 | Schwarz | |
| 2010/0161432 | A1 | 6/2010 | Kumanov et al. | |
| 2010/0280895 | A1 | 11/2010 | Mottola | |
| 2011/0040655 | A1 | 2/2011 | Hendrickson | |
| 2011/0191207 | A1 | 8/2011 | Schueller | |
| 2011/0258058 | A1 | 10/2011 | Carroll et al. | |
| 2011/0270662 | A1 | 11/2011 | Rocco | |
| 2012/0059741 | A1 | 3/2012 | Khan et al. | |
| 2013/0110385 | A1* | 5/2013 | Heed | G06Q 10/047 701/117 |
| 2013/0110393 | A1* | 5/2013 | Heed | G01C 21/3484 701/430 |
| 2013/0191173 | A1 | 7/2013 | Shobola | |
| 2013/0211814 | A1 | 8/2013 | Derks et al. | |
| 2014/0006310 | A1 | 1/2014 | Hamilton | |

OTHER PUBLICATIONS

Garrett, James M.; Non-Final Office Action for U.S. Appl. No. 13/212,905, filed Aug. 18, 2011, dated Apr. 21, 2014, 11 pgs.

Garrett, James M.; Non-Final Office Action for U.S. Appl. No. 13/212,905, filed Aug. 18, 2011, dated Sep. 19, 2012; 15 pgs.

Garrett, James M.; U.S. Patent Application Entitled: Mobile Restaurant Ordering System, U.S. Appl. No. 13/212,905, filed Aug. 18, 2011; 35 pgs.

Garrett, James M.; U.S. Provisional Application Entitled: Timely, Proximity-Based Mobile Restaurant Ordering System under U.S. Appl. No. 61/390,607, filed Oct. 6, 2010; 18 pgs.

Garrett, James M.; Non-Final Office Action for U.S. Appl. No. 13/212,905, filed Aug. 18, 2011, dated Sep. 16, 2014, 18 pgs.

Garrett, James M.; Advisory Action for U.S. Appl. No. 13/212,905, filed Aug. 18, 2011, dated May 12, 2015, 3 pgs.

Garrett, James M.; Final Office Action for U.S. Appl. No. 13/212,905, filed Aug. 18, 2011, dated Feb. 27, 2015, 15 pgs.

Garrett, James M.; Non-Final Office Action for U.S. Appl. No. 13/212,905, filed Aug. 18, 2011, dated Aug. 26, 2015, 17 pgs.

Garrett, James M.; Advisory Action for U.S. Appl. No. 13/212,905, filed Aug. 18, 2011, dated Mar. 28, 2016, 3 pgs.

Garrett, James M.; Final Office Action for U.S. Appl. No. 13/212,905, filed Aug. 18, 2011, dated Feb. 9, 2016, 29 pgs.

Garrett, James M.; Final Office Action for U.S. Appl. No. 13/212,905, filed Aug. 18, 2011; dated May 12, 2017; 22 pgs.

Garrett, James M.; Non-final Office Action for U.S. Appl. No. 13/212,905, filed Aug. 18, 2011; dated Dec. 2, 2016; 22 pgs.

(56) References Cited

OTHER PUBLICATIONS

Garrett, James M.; Non-final Office Action for U.S. Appl. No. 13/212,905, filed Aug. 18, 2011; dated Nov. 1, 2017; 27 pgs.

* cited by examiner

CUSTOMER INTERFACE RESTAURANT SYSTEM

CROSS-REFERENCE TO RELATED APPLICATIONS

This application is a continuation-in-part of U.S. patent application Ser. No. 13/212,905 filed Aug. 18, 2011, which claims priority benefit to U.S. Patent Application Ser. No. 61/390,607 filed Oct. 6, 2010, the entire disclosure of each application is hereby incorporated by reference.

TECHNICAL FIELD

The present disclosure generally relates to ordering systems and, more specifically, to a proximity and/or time based ordering system.

BACKGROUND

Regarding interactions between customers or users and restaurants, a restaurant may seek to provide quality, accessible, and reliable customer service in order to foster positive customer relationships. In response to receiving good, quality service, a customer is likely to return for additional business in the future and may also speak highly of the restaurant with others. When a customer places an order at a remote location from a restaurant, the accuracy of creating and finishing the order at the restaurant for the customer is part of the service experience. When restaurants are able to satisfy customers with sound service practices, these restaurants may be able to create strong relationships with customers built on dependability and quality. As a result, these restaurants that provide excellent customer service are usually able to achieve long-term success.

SUMMARY

The present disclosure generally relates to ordering systems and, more specifically, to a proximity and/or time based ordering system. A computer-implemented method, according to various implementations disclosed herein, comprises receiving, in a computer system, a selection of an order by a user of a user device, the order including a selection of a restaurant and at least one item to purchase from the restaurant, and determining, by the computer system, if the user is within a geofence defined in regard to the restaurant. Further, upon determining that the user is not within the geofence, holding, by the computer system, the order from being prepared at the restaurant, and upon determining that the user is within the geofence, releasing, by the computer system, the order to be prepared at the restaurant.

A non-transitory computer-readable medium encoded with computer executable instructions, according to various implementations, comprises logic adapted to present a selection of an order to a user on a user device, the order including a selection of a restaurant and at least one item to purchase from the restaurant. Also, the computer-readable medium includes logic adapted to transmit to a server the order selected by the user on the user device. Further, the computer-readable medium includes logic adapted to receive information from the server corresponding to a geofence and logic adapted to monitor the user device to determine if the user device is within the geofence. Additionally, the computer-readable medium includes logic adapted to release the order to a preparation area of the restaurant upon determining that the user device is within the geofence.

A computer-implemented ordering system, according to various implementations, comprises at least one server, at least one restaurant system communicatively connected to the server, and at least one user device configured to store and execute a software application, the at least one user device communicatively connected to the server. Additionally, the software application may be configured to enable a user of the at least one user device to place an order by selecting a restaurant and at least one item to purchase from the restaurant and transmit the order to the at least one restaurant system, and the ordering system may be configured to determine if the user is within a geofence defined in regard to the selected restaurant and hold the order from being prepared at the restaurant until the user is within the geofence.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DESCRIPTION OF THE FIGURES

The features and components of the following figures are illustrated to emphasize the general principles of the present disclosure and are not necessarily drawn to scale. Corresponding features and components throughout the figures may be designated by matching reference characters for the sake of consistency and clarity. Although dimensions may be shown in some figures, such dimensions are exemplary only and are not intended to limit the disclosure.

DETAILED DESCRIPTION

The present disclosure describes systems and methods for an ordering system. Although various implementations of the present disclosure are described with respect to ordering systems and methods, it should be understood that the present disclosure also may include other types of ordering systems and methods without departing from the principles described herein. Other features and advantages will be apparent to one of ordinary skill in the art upon consideration of the general principles described herein, and all such features and advantages are intended to be included in the present disclosure.

Figure 1:
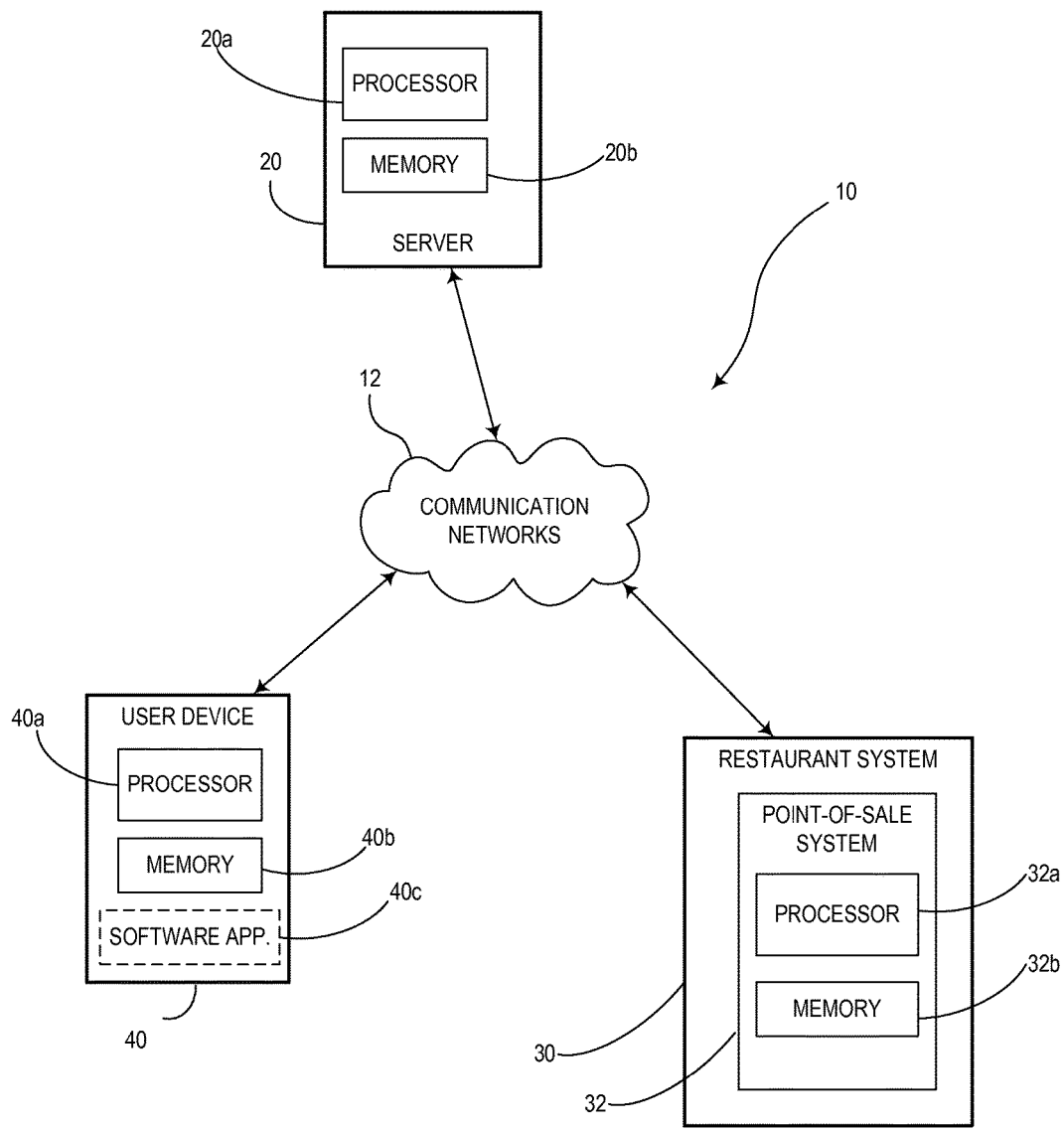
FIG. 1 is a block diagram illustrating an ordering system and network, according to various implementations of the present disclosure.

FIG. 1 is a block diagram illustrating an ordering system and network, according to various implementations of the present disclosure. The ordering system 10 includes server 20, restaurant system 30, and user device 40. These and other systems are capable of interacting and communicating via one or more communication networks 12. The communication networks 12 may include telephone lines, such as land line or public switched telephone network (PSTN)

systems, mobile phone channels and systems (e.g., cellular towers), communication channels for exchanging data and information, such as a local area network (LAN), wide area network (WAN), the Internet, or other data, communication, and/or telecommunication networks.

In the current embodiment, server 20 includes a processing device 20a and memory 20b, the memory 20b being operatively connected to the processing device 20a. Server 20 may comprise multiple servers, computers, and/or other computing devices, and server 20 may be a virtual, cloud-based, and/or SAS system.

Restaurant system 30 may include one or more computing or processing devices included within or in the surrounding area of a restaurant, such as a point-of-sale system ("POS") 32, operatively connected to network 12. In some embodiments, where a POS 32 is included, POS 32 includes a processing device 32a and a memory 32b, the memory 32b being operatively connected to the processing device 32a. Restaurant system 30 may also include additional computers and servers, which may include at least one memory operatively connected to at least one processor, and the additional computers and servers may be operatively connected to the POS 32 and/or network 12. For instance, a restaurant may comprise a number of ordering stations or kiosks that allow cashiers, servers, or customers to place orders for products offered by the restaurant, as should be understood by those skilled in the art.

User device 40 may be one or more devices that customers or users may use to communicate and interact with the server 20, the restaurant system 30, and/or other systems or devices within the ordering system 10. Each user device 40 includes a processing device 40a and a memory 40b, the memory 40b being operatively connected to the respective processing device 40a. Additionally, software application 40c may reside in the memory 40b of the user device 40 and may be executed on the processor 40a of the user device 40. According to embodiments, the user device 40 is configured to output or transmit global positioning satellite ("GPS") location updates. The user device 40 may represent a cellular phone, music player, tablet computer (e.g. an IPAD® mobile digital device from Apple, Inc. of Cupertino, Calif.), mobile gaming system, laptop, etc. According to some embodiments, the user device 40 comprises a device configured to execute version 4 or greater of the iOS operating system developed by the aforementioned Apple Inc., such as an IPHONE® mobile digital device or IPAD® mobile digital device (referred to herein as "iOS devices"). In other embodiments, the user device 40 comprises a device configured to execute version 2 or greater of the ANDROID™ platform from Google Inc. of Mountain View, Calif. (referred to herein as "Android devices"). In further embodiments, the user device 40 may comprise a device manufactured by the HTC Corporation of Taiyuan, Taiwan. In further embodiments, user device 40 may represent two or more devices. For example, a user may place an order with a restaurant on one user device 40, and then the user may use another user device to track their current GPS coordinates. Therefore, some user devices 40 may be used that do not include GPS capabilities as long as one or more other user devices do include GPS capabilities.

It should be understood that the GPS system of user device 40 may be configured to utilize assisted GPS ("aGPS"). Those skilled in the art should understand that aGPS is a system that improves the startup or time-to-first-fix ("TTFF") of a GPS system. While conventional GPS systems use radio signals from satellites only, aGPS additionally uses network resources to locate and use the satellites in a faster and more efficient manner, as well as during conditions when the signal between the satellites and the mobile device are weak. In a scenario where user device 40 is configured to use aGPS, the user device 40 may transmit an accuracy measurement when the user device 40 transmits GPS information. The accuracy measurement typically corresponds to a measurement by which the actual location of the user device 40 may deviate. It should also be understood that the GPS data and coordinates referred to in the following explanation are intended to include the data and coordinates provided by both conventional GPS and aGPS systems.

According to further embodiments, user device 40 is configured to download, store, and execute mobile or web applications. The applications may be provided by an online service, such as the APP STORE for iOS devices or the ANDROID MARKET for Android devices. The processing devices 20a, 32a, 40a within server 20, restaurant system 30, user device 40, and any other computer, server, or other computing device within ordering system 10, including within a restaurant, may be a processor, microprocessor, controller, microcontroller, other appropriate circuitry, or any combination thereof. For example, multiple electronic devices configured to operate together within each computing device may be considered a "processing device." The memory 20b, 32b, 40b in each computing device may be any type of memory or computer-readable medium that is capable of being accessed by the respective processing device 20a, 32a, 40a. For instance, the memory may be random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium that may be used to carry or store computer program code in the form of computer-executable programs, instructions, or data. Each processing device 20a, 32a, 40a may also include a portion of the memory 20b, 32b, 40b accessible only to the processing device, commonly referred to as "cache." Thus, the memory 20b, 32b, 40b may be part of the respective processing device 20a, 32a, 40a, may be separate, or may be split between the relevant processing device and one or more separate memory devices.

Each memory 20b, 32b, 40b within server 20, restaurant system 30, user device 40, and any other computer, server, or any other computing device within ordering system 10, may contain computer-executable program code or instructions that, when executed by the respective processing device 20a, 32a, 40a, perform at least a portion of the processes described herein. Each memory 20b, 32b, 40b may also comprise one or more data structures for storing information, such as a database or a table. The computer executable program code or instructions in this scenario, as should be known to those skilled in the art, may include one or more application programs, other program modules, program data, firmware, and/or an operating system.

In some embodiments, POS 32 is configured to communicate via an application programming interface (API) with resources external to one or more restaurants, such as server 20. The API is typically implemented by the POS 32, although it should be understood that the API may be implemented by another computer or server included in or operably connected to the restaurant system 30. Examples of POS systems that include an API configured to handle communications with external systems include the COM- PRIS POS Solution offered by NCR Corporation of Duluth, Ga., the POS systems offered by Radiant Systems, Inc.® of Alpharetta, Ga., including the ALOHA® system, the POS systems offered by Micros Systems, Inc.® of Columbia, Md., including the MICROS PCWS system, and the POS systems offered by Restaurant Data Concepts, Inc. of Warwick, R.I., doing business as POSitouch®.

According to embodiments, the API implemented by the POS 32 or other system defines the manner by which an external resource may request the POS 32 to process an order, as described below. For instance, the API defines the format, syntax, and data elements required by POS 32 in order to carry out an order. The API may define, for example, that POS 32 requires a unique identifier for each product of an order, as well as information sufficient to effect payment for the order. It should be understood that additional or less information may be required to process an order depending on the specific API and/or POS 32 used by the restaurant system 30. For instance, the POS 32 may also require a "modifier" for each product in an order, as described in more detail below. Regardless of the particular format, once the data required to process an order is provided to the POS 32 via the API, the POS carries out the order in a manner similar to orders provided to the POS from within the one or more restaurants, such as via an ordering station or kiosk as described above. In some embodiments, POS 32 and/or the API may not be required.

In some embodiments, server 20 communicates with the API of POS 32 via a software application (separate from software application 40c) referred to as a POS bridge. The POS bridge may be installed on and executed by POS 32 or by another computer or server located within the restaurant system 30 that is operatively configured to communicate with the POS 32 via the API and with server 20. The POS bridge is configured to provide data representative of the products offered by the one or more restaurants from the API to server 20 and to provide data representative of an order received from the server 20 to the API in a manner sufficient to affect the order. The POS bridge operates to allow server 20 to transmit a request to POS 32, which the POS bridge translates into a request understood by the POS's API, regardless of the specific POS system implemented within the restaurant system 30. It should be understood that any communications described herein between server 20 and POS 32 may be accomplished via the POS bridge and the API.

According to some embodiments, server 20 stores information about the products offered by the one or more restaurants in the memory 20b. In some embodiments, this is accomplished by server 20 transmitting a request to the POS 32 for information about the products offered by the one or more restaurants. The POS 32 returns data for each product offered by the one or more restaurants, which, in some embodiments, may take the form of an XML file. The server 20 may then parse the data returned by the POS 32 and store the data in a profile for each restaurant located in the memory 20b. In other embodiments, the information can be sent to the server 20 (without a request from server 20) or the information can be input into server 20 manually.

In some embodiments, the server 20 may be configured to provide an administrative or backend website that allows a coordinator (e.g., a restaurant manager) tasked with managing the product information for one or more restaurants to access, change, and update the information stored on server 20. In some embodiments, the coordinator may gain access to the backend website by supplying a username and password to server 20. The information about the products offered by an establishment may be different for each restaurant and may include the name of an item, its price, time during which the item is available, amount of time required to prepare the item, sides or options available for the item, hours of operation, time periods of high volume at the one or more restaurants, etc. The coordinator may also structure the product information as desired so that it may include sub categories, such as breakfast, lunch, and dinner, or other categories, such as appetizers, entrees, beverages, etc. The coordinator may also associate each item with item modifiers, such as add-on items which may modify the price and make-up of the item (e.g., whether cheese should be added to a sandwich). Each item may also be associated with a photograph or image representative of the item. An item may be associated with a qualifier, such as whether it is a "sale" item, and a corresponding discounted price. It should be understood that the configuration and operation of such a backend website may vary depending on the information required by POS 32, its API, server 20, the POS bridge, and other aspects of ordering system 10, without departing from the scope of the present disclosure. In many embodiments, for example, the backend website prevents the coordinator from altering the information about the products offered by the one or more restaurants that server 20 transmits to the POS bridge to effect an order.

Figure 2:
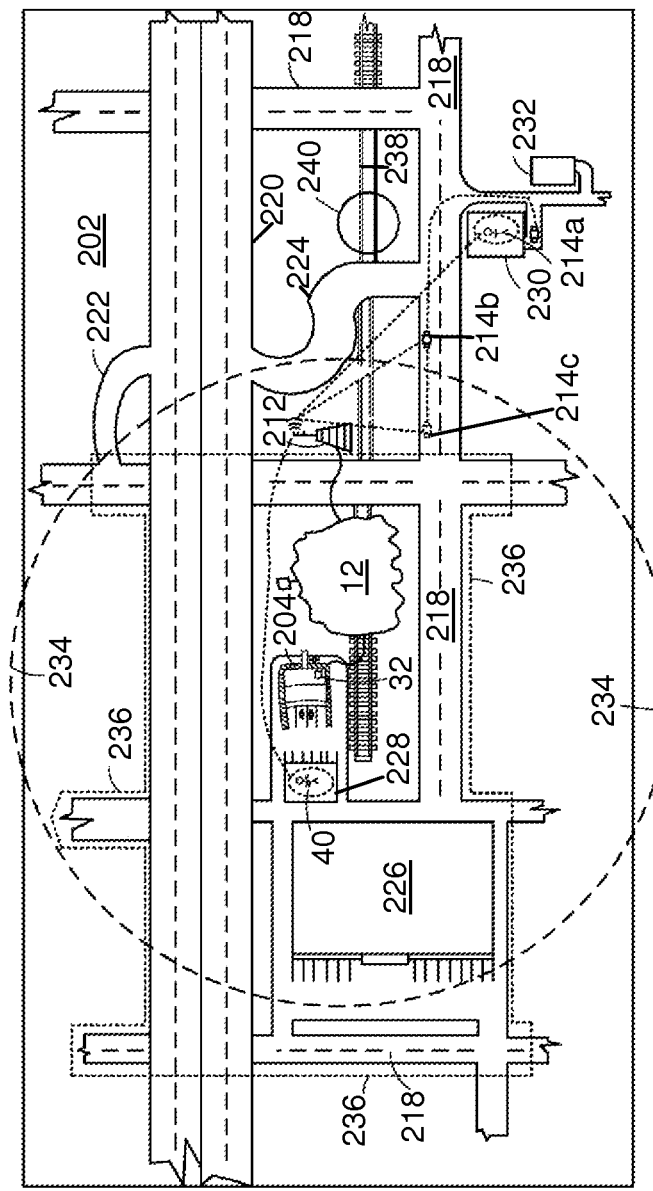
FIG. 2 is a partial schematic, overhead view of an exemplary ordering system, including geofencing, according to various implementations of the present disclosure.

FIG. 2 provides an exemplary geographic region 202, and the geographical region 202 comprises an exemplary restaurant 204. The restaurant 204 may include one or more computing or processing devices included within the restaurant 204, such as POS 32, operatively connected to the communication network 12, which the exemplary embodiment of FIG. 2 includes WAN 208 and one or more cellular tower 212. However, the physical location of the components of the restaurant ordering system 10 is not restrictive, and they may be located in any physical location or a number of physical locations. Additionally, some components of the restaurant ordering system 10 may not even require a physical location but may be implemented on a computer or other type of system. In the example illustrated, shown in FIG. 2, geographical region 202 further comprises a number of roads 218, including a highway 220 having an off ramp 222 and an on ramp 224. Geographical region 202 may comprise other structures, as should be understood in the art, including additional retail establishments 226 and 228 and residential homes 230 and 232.

Prior to the use of ordering system 10 by a user, the coordinator responsible for the data associated with the one or more restaurants may use the administrative or backend website to provide server 20 with information about the one or more restaurants, including the location of each restaurant. The server 20 may be configured to store information associated with multiple restaurants and groups of restaurants and provide access to a multitude of coordinators. The coordinator(s) may access the backend website provided by server 20 by logging into the website using a suitable internet browser and provide the street address or GPS coordinates of the restaurant 204 to the server 20. In some embodiments, if the coordinator provides the street address of a restaurant (e.g., 204) to server 20 via the backend website, the server 20 may retrieve the GPS coordinates associated with the street address using a third party maps service, for example. The coordinator may provide additional information about the restaurant 204, including an identification of times during which the restaurant is busiest. Once information is provided about the one or more restaurants by a coordinator, the coordinator may then define a "geofence" to be associated with each restaurant. A geofence may be referred to as a virtual perimeter for a real world geographic area, such as area 202. For example, FIG. 2 includes two geofences: a circular geographic region denoted by dashed line 234 and a polygonal geographic region denoted by dotted line 236. According to embodiments, the POS 32 or other components of the ordering system 10 use the geofence 234, 236 to determine when to release an order placed by a user in the manner described below with respect to FIGS. 2 and 3.

The coordinator may define the geofence 234, 236 for each restaurant (e.g., 204) using the backend website in a multitude of ways. In some embodiments, for instance, the coordinator provides a surrounding distance from each restaurant (e.g., 204) which may serve as the geofence 234, 236. For example, the coordinator provides a value of one mile indicating that the geofence 234, 236 should include the entire geographic region located within one mile of the restaurant. The ordering system 10 may associate the value of the radius with the restaurant, and the area within the radius will be within the geofence 234, 236. In some embodiments, the coordinator may use time parameters for the geofence 234, 236 instead of distance parameters, as previous described. For example, the coordinator may define the geofence 234, 236 as five minutes from the restaurant.

In another embodiment, server 20 may present a map associated with each restaurant via the maps service. That is, server 20 may request a map from the maps service by transmitting the location of each restaurant to the maps service via an API to be used as the center of the map. The data returned by the maps service is transmitted to the coordinator's internet browser and presented to the coordinator as a map. In some embodiments, the map service also provides a radius tool to the coordinator's internet browser based on the instructions transmitted to the maps service by server 20. The coordinator may utilize the radius tool provided to create a circular geographic region surrounding each restaurant, such as area 234, on the map presented by the internet browser, in a manner that should be understood by those skilled in the art. When the coordinator activates a button associated with the map to save the geographic region, server 20 determines the radius of the circular geographic region associates the value of the radius with the restaurant, and stores the information in the memory 20b.

In other embodiments, the maps service may provide a polygon tool to the coordinator's internet browser. The coordinator may utilize the polygon tool provided to create a polygonal geographic region surrounding the restaurant on the map, such as geofence area 236. When the coordinator activates the button associated with the map to save the geographic region in this embodiment, the maps service transmits to server 20 the GPS coordinates for each vertex of the polygon surrounding the restaurant as defined by the coordinator. The server associates the vertexes with the restaurant and stores the information in memory.

In some embodiments, once the coordinator provides the surrounding distance, the user device 40 may monitor the location of the user to determine if the user is within the geofence 234, 236, as the server 20 would provide information of the geofence 234, 236 to user device 40 via the communication network 12. In some embodiments, the server 20 may receive updates from the user device 40 and the server 20 will determine if the user is within the geofence 234, 236. In some embodiments, the coordinator may provide a value to be used as a radius to define a circular region, the center of which may be the restaurant.

In some embodiments, GPS coordinates may be relayed to the user device 40, and the user device 40 may be able to determine when the user is within the geofence 234, 236. Additionally, as previously stated, the user device 40 may have GPS and mapping capabilities, and since the user device 40 may obtain the geofence 234, 236 GPS coordinates from the server 20, the user device 40 may determine when the user is within the geofence 234, 236 and trigger subsequent steps in ordering system 10 via the software application 40c.

The user device 40 or other portions of the ordering system 10 that monitor the location of the user may automatically update and use features of the user device 40 to estimate the amount of time it will take the user to arrive at the restaurant. Like with the distance geofence 234, 236, once the user is within the time geofence 234, 236, subsequent steps may be triggered in ordering system 10, as will be described later. Additionally, in other embodiments, the geofence 234, 236 may be defined based on distance and time or a combination of both. Further, as will be described later, other parameters and factors may be used to define the geofence 234, 236 areas.

Figure 3:
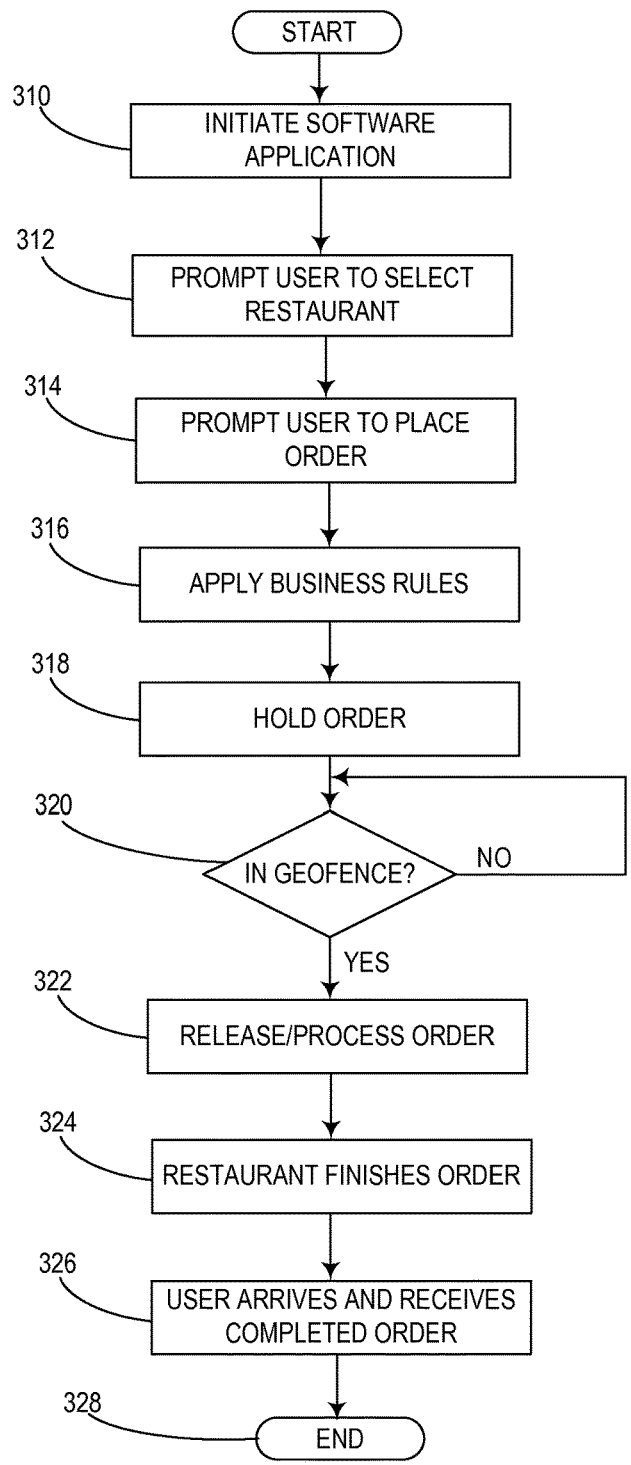
FIG. 3 is a flowchart illustrating an exemplary process for fulfilling an order using the ordering system of FIGS. 1 and 2, according to various implementations of the present disclosure.

FIG. 3 illustrates an exemplary process for carrying out an order using ordering system 10. Accordingly, the following explanation of FIG. 3 is made with reference to the ordering system 10 of FIG. 1 and the geographic region of FIG. 2. At step 310, a user of a user device 40 may download and install a software application 40c on the user device 40, as described above, and the information about the at least one restaurant may be sourced from the server 20 on demand by the software application 40c, including the products offered by the at least one restaurant. The user may initiate the software application 40c by selecting indicia associated with the application that is presented by the user device 40 after installation, and in some embodiments, the user will be required to create an account that may include a user name and password to access the software application 40c. Once initiated, the software application 40c may present a graphical user interface ("GUI") via user device 40 to the user.

At step 312, once the GUI of the software application 40c is presented to the user, the software application 40c may prompt the user to select one or more restaurants. A multitude of ways to select a restaurant may be supported by the software application 40c. For example, a user may input text into a search option (e.g. the user can input a name or location of a restaurant), a map or list may be presented to the user based on the user's current location or another location provided by the user, the user may select or input criteria (e.g. genre or type of food, price, location, size) and be presented with a map or list of food that meets the criteria, among others.

Once the user selects a restaurant, the server 20 will present the products offered by the restaurant to the user on the user device 40, and the user may place their order on the user device 40, shown at step 314. The products offered by the restaurant to be selected and purchased may be presented via the GUI. The software application 40c may include information corresponding to the products when installed or may be configured to download the information from server 20 when initiated and present the information via the GUI. The information may be requested by the server 20 from the POS 32 of the restaurant system 30 after the user selects the restaurant on the user device 40. The information may include a menu having its own predefined structure. The menu may include sub menus, such as breakfast, lunch, and dinner, as well as menu groups, such as appetizers, entrees, beverages, etc., corresponding to the categories and other information provided by the coordinator on the administrative or backend website, as described above. Each item on the menu may include its own predefined structure depending on the particular restaurant and may include details such as a description, price, preparation time, available sides or combinations, among others.

At step 316, after the user has input or selected their order on the user device 40, the order is transmitted back to the server 20 via the communication network 12, and the server 20 may apply the information the coordinator provided to the administrative or backend website (i.e., business rules). For example, in some embodiments, the server 20 may determine how long it will take to prepare the order provided by the user based on the time it takes to prepare each item (input by the coordinator), the day of the week, and/or the time of day (determining the level of traffic at the restaurant and staffing), among others. Additionally, in some embodiments, server 20 may communicate with the POS 32 of the restaurant to determine how long it will take to prepare the order. Further, in some embodiments, when an approximation has been made for the time it will take to prepare the order, the user device 40 may present the user with pick-up time options. For example, if it is 3:00 P.M. and it will take fifteen minutes to prepare the user's order, the user, via the GUI of the user device 40, may be presented with pick-up times for their order starting at 3:15 P.M and continuing on (e.g., 3:20 P.M., 3:25 P.M.) based on the preferences selected by the coordinator on the administrative or backend website. For example, the coordinator may select to allow the user to input a specific pick-up time after 3:15 P.M. or the user may be provided selections based on, for instance, one, five, ten, or fifteen minute increments. Further, in other embodiments, a user may not be able to select a pick-up time. In some embodiments, the software application 40c on the user device 40 may already include the business rules to be applied to a user's order.

In some embodiments, user device 40 begins monitoring GPS data itself or transmitting GPS data to server 20 either at the time of the order or shortly thereafter, which will be described in more detail below. In some embodiments, the user also uses the user device 40 to pay for the order. While the ability to pay for the order may be included in the same user device 40 used to place the order, it should be understood that a separate application may be used instead without departing from the scope of the present disclosure.

At step 318, depending on the preferences of the coordinator and aspects of ordering system 10, the ordering system 10 may hold the order at different locations within the ordering system 10. For example, in some embodiments, the order may be held at the user device 40 or server 20 until the user is within the geofence 234, 236. However, in other embodiments, the order may be transmitted to the restaurant system 30, particularly the POS 32, once the order is made by the user on the user device 40, but the order may not be relayed to the preparation area or signaled to prepare until the user is within the geofence 234, 236, further described below.

At step 320, ordering system 10 determines whether the user placing the order is located within the geofence 234, 236 associated with the restaurant the user selected, such as area 234. As previously described, in some embodiments, user device 40 monitors the GPS location of the user, which is the same location as the user device 40. Additionally, server 20 can receive and track the GPS position of the user. Server 20 makes this determination based on the GPS data transmitted by the user device 40 to the server 20. For instance, after placing the order, the user of user device 40 may begin to travel toward the restaurant to receive the order (seen in FIG. 2 at position 214a). This may be accomplished by the use of a vehicle, walking, or any other method to travel toward the restaurant (seen in FIG. 2 at position 214b). In some embodiments, user device 40 continues to monitor the GPS location of the user device 40. As previously described, user device 40 may receive information pertaining to the geofence 234, 236 (e.g., GPS coordinates) from the server 20, and the user device 40 may use its own operating system and applications to monitor and track the position of the user device 40, while continuously comparing the present position of the user device 40 to the geofence 234, 236. After the user device 40 enters area the geofence (e.g., 234), the user device 40 determines that user device 40 is within the geofence (seen in FIG. 2 at position 214c) and proceeds to step 322. By way of another example, an order placed by a user of user device 40 is automatically released at steps 320 and 322 when the user is already within the geofence 234, 236 at the time of placing the order, as determined by the user device 40 based on corresponding GPS data. In the event the geofence 234, 236 region has been manually defined by the coordinator as a polygonal area (or any other shape the coordinator defines), such as geofence 236 illustrated in FIG. 2, a point-in-polygon ("PIP") or Ray casting algorithm may be used to determine whether user device 40 is within the geofence 234, 236.

In some embodiments where the user device 40 monitors its own position relative to the geofence 234, 236, the user device 40 may be configured to ping or send a "still alive" signal to the server 20 at predetermined or selected times in order to notify the server 20 that user device 40 is still able to communicate with communication network 12. In some embodiments, if server 20 is unable to locate user device 40 or if user device 40 fails to ping the server 20 within the specified time, process flow proceeds from step 320 to 322. That is, if server 20 has not received GPS data or a ping notification from user device 40 for longer than a predefined or selectable amount of time, such as 300 seconds (or 5 minutes), the server 20 sends or releases the order to restaurant system 30, particularly POS 32, if applicable.

At step 322, the order will be processed by the restaurant (e.g., 204). As previously described, depending on the preferences of the coordinator and aspects of ordering system 10, the order may be held at different locations. For example, in some embodiments, the order may be held by the user device 40 or server 20 until the user is within the geofence 234, 236; however, in other embodiments, the order may be transmitted to the restaurant system 30, particularly the POS 32, once the order is made by the user on the user device 40, but the order, or item(s) purchased, may not be relayed to the preparation area, or otherwise started being prepared, until the user is within the geofence area 234, 236. If the order is held by the user device 40, then once the user is within the geofence 234, 236, the order may be transmitted to the server 20 and then on to the restaurant system 30 (or from the user device 40 directly to the restaurant system 30), particularly the POS 32 if applicable, which then processes the order in the restaurant. Likewise, if the order is held by the server 20, then when the user device 40 (or other aspect of ordering system 10) determines the user is within the geofence 234, 236, the order may be released from the server 20 to the restaurant system 30. Further, if the restaurant system 30 holds the order, then when the user device 40 (or other aspect of ordering system 10) determines the user is within the geofence 234, 236, the order may be released to the preparation area, or otherwise initiate preparing the order. At this point, server 20 or POS 32 may transmit a notification to user device 40 that the order has been released and/or it is being prepared.

At step 324, the restaurant finishes packaging or otherwise preparing the items ordered by the user. At step 326, the user may arrive and receive the completed order. In an embodiment where the user has not previously paid for the order, the user may pay for the order at step 326. Payment may be accomplished via interaction with a cashier or kiosk located in the restaurant or any other suitable method understood by those skilled in the art. The process then may terminate at step 328, which may include a number of ancillary tasks. For instance, ordering system 10 may transmit a survey or feedback request to user device 40, as described in more detail below.

It should be understood that the ordering system 10 may be configured to process orders for multiple restaurants located both within and outside of geographic region 202 in a manner similar to that described above. That is, the ordering system 10 may be configured to process orders received from multiple user devices 40 in the manner described above for restaurants within geographic region 202 or within a different geographic region. It should also be understood that server 20 and POS 32 may be combined into a single device in a scenario where the server 20 is configured to process orders for one or more restaurants. POS 32 may perform the functions described above with respect to both the POS 32 and server 20, including being configured to handle any data transmitted to or from user device(s) 40.

In an embodiment where the geofence 234, 236 is defined by a radius, ordering system 10 may use an adaptive algorithm to modify the geofence 234, 236 based on one or more factors. The adaptive algorithm may modify the geofence 234, 236 when a user places an order or before determining whether the user is within the geofence 234, 236. For example, the algorithm may be executed to modify the geofence 234, 236 when the user places the order at step 314, the coordinator information or business rules are applied at step 316, or each time GPS data is updated to determine whether the user has entered the geofence 234, 236 at step 320. In some embodiments, the algorithm varies depending on the time of day when the algorithm is executed. By way of example, the adaptive algorithm, that defines a radius, may be defined as:

$$u+((v*t+(a/2))*c*p)$$

As shown, u may be the default geofence 234, 236 (previously described), v may be the velocity the user is traveling, t may be the order preparation time, a may be an aGPS factor, c may be an empirical evidence coefficient, and p may be peak hours or peak activity of the restaurant. With regard to p, the coordinator may, for example, input peak hours into the administrative or backend website, so the geofence 234, 236 may be adjusted depending on the level of activity projected at the restaurant. Additionally, in some embodiments, the restaurant system 30 may transmit information associated with the level of activity at the restaurant to the server 20 (e.g., the average wait, the number of orders in the system, the user's order in the preparation queue, among others), and the geofence 234, 236 may be adjusted based on the information received from the restaurant system 30.

Additionally, order preparation time (or t), as previously described, is the time it takes for an order to be completed once released to be prepared at the restaurant. Order preparation time may be expressed in seconds, minutes, or hours, among others and is defined by each restaurant coordinator. The coordinator responsible for the data associated with each restaurant stored by server 20, as described above, may provide the order preparation time to the server 20, or in other embodiments, the provided order preparation time may be adjusted based on the level of activity at the restaurant. In some embodiments, order preparation time may be an average time defined by each restaurant and/or coordinator. In some embodiments, order preparation time may be specific to each item. As such, the order preparation time for the entire order may factor into the defined geofence 234, 236. Further, a positional accuracy value (seen as a in the exemplary algorithm above) may be used when the user device 40 is configured to use aGPS.

Moreover, in some embodiments, the speed or velocity (seen as v in the exemplary algorithm above) that the user is traveling may be taken into account in defining the geofence 234, 236 or used in an adaptive algorithm. The speed or velocity that the user is traveling may be determined by GPS monitoring over a period of time. For example, if the user is five miles away from the restaurant two minutes after placing the order and is four miles away three minutes after placing the order, then the ordering system 10 may recognize the user is traveling at one mile/minute. Such a speed or velocity may be compared to the expected speed or velocity (which may be defined by the coordinator and take into account the time of day), and adjustments (make larger or smaller) may be made to the geofence 234, 236 based on the data provided from GPS monitoring.

Also, an empirical evidence coefficient (seen as c in the exemplary algorithm above) is a factor applied to an equation in order to increase the algorithm's accuracy. By default, empirical evidence coefficient is one (1) but may be altered each time an item is received by a user (at step 326) using the ordering system 10. For instance, if the food is prepared prior to the user's arrival by a certain amount of time, empirical evidence coefficient may be decreased. If the user arrives before the item is prepared so that the user must wait for the item, empirical evidence coefficient may be increased (such information may be tracked by the coordinator). In some embodiments, empirical evidence coefficient may be increased or decreased in one or more predetermined increments, such as by five percent (5%) increments. In some embodiments, server 20 may increase or decrease empirical evidence coefficient based on the responses to a user survey provided to a user after receiving an order placed via ordering system 10, as described below. Such information allows the algorithm to modify the geofence 234, 236 based on other factors, such as new or untrained employees or typical traffic patterns of the associated geographic area, or other information that affects the actual time required to prepare an item or order offered by the restaurant. Empirical evidence coefficient may be applied to the entire menu offered by one or more restaurants or may be defined with respect to each item offered. For instance, server may 20 calculate a radius for the geofence 234, 236 using the adaptive algorithm described above based on the empirical evidence coefficient for each item included in the order. Server 20 may then define the geofence 234, 236 using the radius with the greatest value.

In some embodiments, server 20 may transmits a survey or feedback request to user device 40, as noted above with respect to step 328 of FIG. 3. The survey includes questions directed to the user, such as whether the order was ready when the user arrived or whether the user had to wait for the order to be prepared or completed. Depending on the user's responses to the survey, server 20 may increase or decrease empirical evidence coefficient c. Server 20 may be configured to transmit surveys only during a predefined timeframe after one or more of the restaurants have been configured to use the ordering system 10 where the predefined timeframe is sufficient to establish empirical evidence coefficient c with certainty. In some embodiments, the survey is transmitted to user device 40 as a text (or "SMS") message, an email, or any other type of notification accepted by the user device 40. The information received in response to the survey may be aggregated over time and used in conjunction with the GPS data previously described to define an accurate geofence 234, 236.

In some embodiments, if any of the variables of the adaptive algorithm are missing or unknown, it may be ignored when the algorithm is executed to modify the geofence 234, 236. In some embodiments, the adaptive algorithm may take into account and utilize only a subset of the variables described above. For instance, the adaptive algorithm may only apply empirical evidence coefficient c to base radius u in order to modify the circular geofence 234, 236 associated with the restaurant. As should be appreciated by those skilled in the art, ordering system 10 may require more than one set of GPS coordinates from user device 40 to determine velocity v in order to modify the geofence 234, 236. In such an embodiment, if there are an insufficient number of GPS coordinates within a timeout period, the order may be automatically released to the restaurant system 30.

In another embodiment, server 20 or user device 40 may be configured to transmit a notification to the restaurant system 30 when the user device 40 or other component of ordering system 10 determines at step 320 that the user has entered the geofence 234, 236. Such notification may be transmitted to POS 32 via the POS bridge and the POS's API or to another computing device, such as a kiosk, located within the restaurant and operatively connected to the restaurant system 30. The notification may be transmitted via any suitable technology understood in the art, such as a text message or SMS, email, and facsimile. As a result, the notification informs a computing device and/or personnel within the restaurant that the user has entered the geofence 234, 236 and/or will be arriving at the restaurant (e.g., 204).

In another embodiment, server 20 is configured to enable the user responsible for the information stored by the server 20 that is associated with a restaurant to define multiple geofences for the restaurant. Server 20 may store the association of a second geofence with a restaurant in the memory 20b. Server 20 may accomplish this by storing an indication that the restaurant is associated with multiple geofences, the center of the additional geofence, and the value of the radius in the restaurant's profile in the memory 20b of server 20. It should be understood that such embodiments allow multiple geofences to be associated with one or more restaurant in order to account for different traffic patterns or modes of transportation. As shown, by way of example in FIG. 2, a second geofence 240 may cover an additional geographic region (that may or may not overlap with the first geofenced region 234) through which tracks 238 pass. It should be understood that tracks 238 are configured to support a train, light rail, other fixed-path transportation system, or any other geofence as previously described.

It should be understood that the above description provides a restaurant with the ability to begin preparing or to finalize an order received from a user on a user device 40 when the user enters a predefined geofence 234, 236. While a restaurant is provided in the examples and description above, those skilled in the art would understand that the systems and methods described above are applicable to other types of retail establishments as well. For example, retail establishment 204 may be a general retailer that makes its for-sale inventory list available via a mobile application, similar to the one described above. Once a user is within the geofence 234, 236, the general retailer may then prepare the order (e.g., retrieves the selected items from store shelves or inventory and package the selected items for the user) in expectation of the user's arrival. Otherwise, the process flow, as provided by example in FIG. 3, would then proceed in the manner described above.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment. Moreover, unless specifically stated any use of the terms first, second, top, bottom, upper, lower, etc. do not denote any order or importance or absolute positioning, but rather the terms first, second, top, bottom etc. are used to distinguish one element from another.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising:
receiving, by a user device, a selection of an order by a user, the order including a selection of a restaurant and at least one food item to purchase from the restaurant;
transmitting the order from the user device to a server;
pinging, by the user device, the server at predetermined interval times to notify the server that the user device is able to communicate with the server;
subsequent to receiving the order, determining, by the user device, whether the user device is within a geofence defined in regard to the restaurant, information pertaining to the geofence received from the server;
upon determining by the user device that the user device is within the geofence, causing the order to be released by the server to a processing device at the restaurant, wherein releasing the order by the server to the processing device results in preparing the at least one food item for presentation to the user; and upon failing, by the server, to receive a ping from the user device within a predetermined time, releasing the order to be prepared to the processing device at the restaurant.

2. The method of claim 1, wherein determining by the user device that the user device is not within the geofence further comprises periodically monitoring by the user device until the user device is within the geofence.

3. The method of claim 1, wherein the geofence is circular, and the restaurant is in the center of the circular geofence.

4. The method of claim 1, wherein the user device uses Global Positioning Satellite (GPS) coordinates to determine whether the user is within the geofence.

5. The method of claim 1, wherein the server determines whether the user device is within the geofence.

6. The method of claim 1, wherein a coordinator contributes business rules to assist in defining the geofence.

7. An ordering system comprising:

a server;

a processing device of a restaurant system communicatively connected to the server; and a user device communicatively connected to the server and configured to ping the server at predetermined interval times to notify the server that the user device is able to communicate with the server, the user device comprising:

ordering means for prompting a user of the user device to select a restaurant and at least one food item to purchase from the restaurant and for receiving an order, the order having the selection of the restaurant and the at least one food item to purchase;

geofence location means for determining whether the user device is within a geofence defined in regard to the restaurant subsequent to the reception of the order by the ordering means; and holding means for holding the order from being communicated through the server to the processing device upon determining by the geofence location means that the user device is not within the geofence and for releasing the order to the processing device upon determining by the geofence location means that the user device is within the geofence;

wherein if the user device fails to ping the server within a predetermined time, the server is configured to release the order to be prepared to the processing device at the restaurant.

8. The system of claim 7, further comprising server holding means configured to hold the order on the server until a determination is made by the user device that the user device is within the geofence and notification is made to the server that the user device is within the geofence.

9. The system of claim 7, wherein the user device uses Global Positioning Satellite (GPS) coordinates to determine whether the user device is within the geofence.

10. The system of claim 7, wherein the geofence is non-circular.

11. The system of claim 7, wherein the holding means further comprises business rules means configured to apply rules provided by a coordinator.

12. An ordering system comprising:

a server;

at least one processing device of a restaurant system communicatively connected to the server; and at least one user device configured to store and execute a software application, the at least one user device communicatively connected to the server and configured to ping the server at predetermined interval times to notify the server that the user device is able to communicate with the server, wherein the software application is further configured to enable the at least one user device to receive an order from a user by enabling the user to select a restaurant and at least one food item to purchase from the restaurant and transmit the order to the restaurant system via the server, wherein the at least one user device is further configured to determine whether the user device is within a geofence defined in regard to the selected restaurant subsequent to receiving at the user device the order including the selection of the restaurant and the selection of the at least one food item to purchase from the restaurant, wherein the at least one user device is further configured to hold the order from being communicated through the server to the at least one processing device of the restaurant until the user is within the geofence, wherein bandwidth between the user device and the server is conserved while the user device is outside the geofence associated with the selected restaurant, and wherein if the user device fails to ping the server within a predetermined time, the server is configured to release the order to be prepared to the at least one processing device at the restaurant.

13. The ordering system of claim 12, wherein the geofence is circular, and the restaurant is in the center of the circular geofence.

14. The ordering system of claim 12, wherein the at least one user device uses Global Positioning Satellite (GPS) coordinates to determine whether the user device is within the geofence.

15. The ordering system of claim 12, wherein a coordinator contributes business rules to assist in defining the geofence.

16. The ordering system of claim 12, wherein the geofence is non-circular.

17. The ordering system of claim 12, wherein the server holds the order from being prepared at the restaurant and releases the order to be prepared to the at least one processing device of the restaurant upon receiving notification from the user device that the user device is within the geofence.

18. The method of claim 1, further comprising calculating, by the server, an area for the geofence based on a preparation time for the at least one food item before determining, by the user device, if the user device is within the geofence defined in regard to the selected restaurant.

19. The system of claim 7, wherein the geofence is circular, and the restaurant is in the center of the circular geofence.

* * * * *